(12) United States Patent
Harada

(10) Patent No.: US 6,799,470 B2
(45) Date of Patent: Oct. 5, 2004

(54) LATERAL FORCE-MEASURING DEVICE FOR A WHEEL, LATERAL FORCE-MEASURING METHOD, AND VEHICLE-INSPECTING SYSTEM HAVING THE DEVICE

(75) Inventor: Kunio Harada, Hiroshima (JP)

(73) Assignee: Kabushiki Kaisha Haradakuni, Hiroshima (JP)

( * ) Notice: Subject to any disclaimer, the term of this patent is extended or adjusted under 35 U.S.C. 154(b) by 0 days.

(21) Appl. No.: 10/080,528

(22) Filed: Feb. 22, 2002

(65) Prior Publication Data

US 2003/0159519 A1 Aug. 28, 2003

(51) Int. Cl.[7] ................................................ G01L 1/00
(52) U.S. Cl. .......................................... 73/774; 73/146
(58) Field of Search ........................ 73/774, 146–146.5, 73/121–123

(56) References Cited

U.S. PATENT DOCUMENTS

| | | | | |
|---|---|---|---|---|
| 3,999,429 A | * | 12/1976 | Pennells | ....................... 73/146 |
| 4,852,398 A | * | 8/1989 | Cargould et al. | ............. 73/146 |
| 4,969,355 A | * | 11/1990 | Doi et al. | ...................... 73/146 |
| 5,167,094 A | * | 12/1992 | Wild et al. | ..................... 451/11 |
| 5,483,823 A | * | 1/1996 | Shibayama et al. | ........ 73/118.1 |
| 6,336,364 B1 | * | 1/2002 | Parker et al. | ................. 73/462 |
| 6,442,469 B1 | * | 8/2002 | Matsuno | ...................... 701/70 |
| 6,513,372 B2 | * | 2/2003 | Anno et al. | ................... 73/146 |

FOREIGN PATENT DOCUMENTS

| | | | | | |
|---|---|---|---|---|---|
| JP | 58086431 A | * | 5/1983 | .......... | G01M/17/02 |
| JP | 63071340 A | * | 3/1988 | .......... | B29D/30/08 |
| JP | 04325227 A | * | 11/1992 | .......... | B29D/30/08 |
| JP | 08-089328 | * | 4/1996 | .......... | G01M/17/06 |
| JP | 9-281009 | | 10/1997 | | |
| JP | 2001-50834 | | 2/2001 | | |

* cited by examiner

Primary Examiner—Edward Lefkowitz
Assistant Examiner—Jermaine Jenkins
(74) Attorney, Agent, or Firm—Sughrue Mion, PLLC

(57) ABSTRACT

A lateral force-measuring device for a wheel is directed to a rotator axially installed with universal function for moving in an axial direction and is dependently rotated by a rotation of a pressed wheel, and a load-measuring device measuring a moving load for an axial direction of a rotator when a rotator is rotated. A vehicle inspecting system incorporating a lateral-measuring device for a wheel thereon is provided.

10 Claims, 3 Drawing Sheets

LATERAL FORCE-MEASURING DEVICE FOR A WHEEL, LATERAL FORCE-MEASURING METHOD, AND VEHICLE-INSPECTING SYSTEM HAVING THE DEVICE

FIELD OF THE INVENTION

The present invention relates to a lateral force-measuring device for a vehicle wheel, a lateral force-measuring method and a vehicle inspecting system having the lateral force-measuring device.

DESCRIPTION OF RELATED ARTS

Generally, the roadway is paved so as to be moderately inclined toward both right and left end from a centerline CL as the apex of the roadway on the view point of drainage as shown in FIG. 4. Accordingly, if a vehicle is run on such road under the condition that a driver releases his or her hold of a steering wheel, a vehicle does not go straight in the running lane but gradually swerves to a left end or a right end. Consequently, wheels are set in common vehicle such that a wheel laterally presses to road when a wheel is rotating, in another word, friction occurs between wheel and road in a wide direction of vehicle. In case of example in FIG. 4, if a wheel presses road leftward when a wheel is rotating, a vehicle can be run straight.

When a vehicle runs straight, a force (hereinafter referred to as a lateral force) occurs in a wheel in wide direction of a vehicle. An occurrence factor mainly comes from a characteristic of wheels themselves (section configuration of a tread portion or a trade pattern, etc), a wheel alignment (camber angle and toe angle, etc), or a suspension geometry.

Therefore, these ones are adjusted so as to produce a proper lateral force in each wheel. Consequently, a vehicle can be run straight.

However, the setting value of the conventional lateral force is determined by computing an adjustment data such as characteristic of wheels themselves, a wheel alignment, and a suspension geometry in the simulation. Accordingly, it has been impossible to measure the magnitude of a lateral force that actually occurs in a wheel when a vehicle is running.

Therefore, it was the reality such that the degree of setting value of a lateral force is determined by repeating an adjustment of such as said wheel alignment and a test running of a vehicle.

The present invention is created to solve aforementioned problem. The primary purpose is to provide a lateral force-measuring device for wheel and a lateral force-measuring method such that a lateral force of wheels can be accurately measured while a running characteristic of vehicle for a lateral force can be simply grasped when a vehicle is designed or after a damaged vehicle caused by accident is repaired.

SUMMARY OF THE INVENTION

Furthermore, the importance of a vehicle inspection has been recently recognized as the method of anticipatively preventing the accidents caused by an insufficient overhaul of a vehicle.

Generally, since a vehicle is inspected in a garage, there has been a demand for requiring less floor space to install an inspection device. Accordingly, an integral-type vehicle inspecting device such as a speed meter tester and a brake tester is developed for use in a limited area on a garage (See Japanese Patent No. 2961403). Besides, a speed meter tester and a brake tester have been used separately in conventional device.

Furthermore, the second purpose is to provide a vehicle inspecting system having a lateral force measuring-system for a wheel embodied therein.

In the present invention, there is provided a lateral force measuring-device for a wheel comprising a rotator and a load-measuring device. A rotator is axially installed with universal function for moving in an axial direction and is dependently rotated by a rotation of a pressed wheel. And a load-measuring device is to measure a moving load for an axial direction of a rotator when a rotator is rotating.

In the present invention, there is provided a lateral force measuring-device for a wheel further wherein the rotator axially installed with universal function for moving in an axial direction is dependently rotated by a rotation of one of a pair of pressed wheels.

A lateral force measuring-device for a wheel of the invention preferably comprises a lateral force-measuring device having a dog relatively attached to said rotator with universal function for rotation, and a load sensor measuring a moving of the dog.

In the lateral force-measuring device for wheel, it is preferable to have a wheel-driving device to rotate said wheel.

Further, in the present invention, there is also provided a vehicle inspecting system capable of materializing a saving of floor space by incorporating a lateral force-measuring device for wheel therein, and of carrying out a consolidated vehicle inspection including a lateral force measurement for wheel.

In addition, the present invention provides a lateral force-measuring method for wheel such that a wheel is pressed to a rotator axially installed with universal function for moving in an axial direction, and a rotator is dependently rotated by a rotation of wheel to measure a moving load for an axial direction of a rotator.

The present invention further comprises such that one of a pair of wheels is independently pressed to a rotator axially installed with universal function for moving in an axial direction.

DESCRIPTION OF THE PREFERRED EMBODIMENTS

Figure 1:
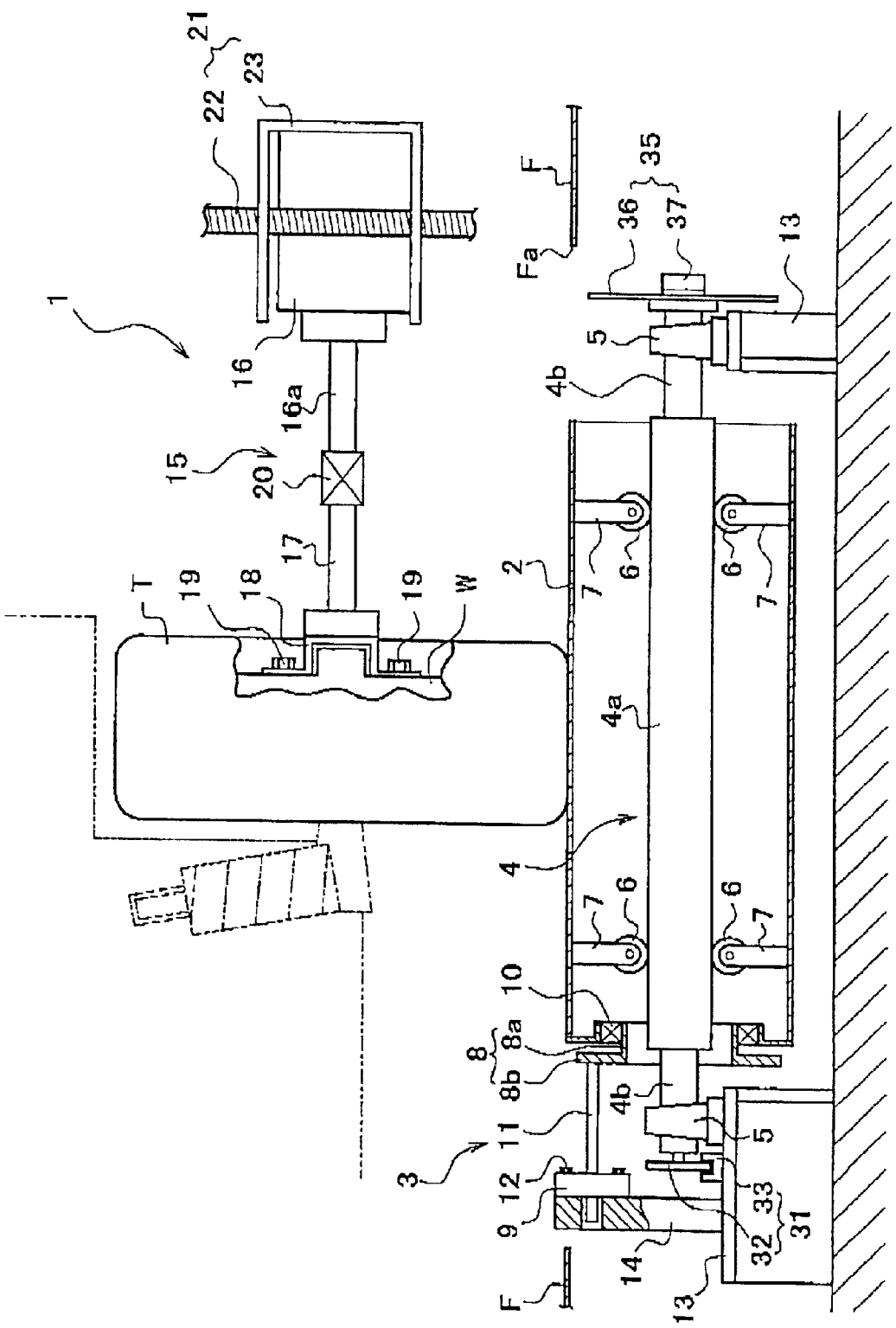
FIG. 1 is a cross sectional view of a lateral force-measuring device.

Hereinafter, the embodiment of the present invention will be described with reference to drawings. FIG. 1 is a cross sectional view of a lateral force-measuring device. As shown in FIG. 1, a lateral measuring-device 1 for wheel has a rotator 2 and a load measuring-device 3.

A rotator 2 is axially installed with universal function in an axial direction for being dependently rotated through a rotation of a pressed wheel T. And a load measuring-device 3 is to measure a moving load in an axial direction of a rotator 2 when a rotator 2 is rotated.

A rotator 2(hereinafter is referred to as a roller) is a material made of a cylindrical shaped steel plate for installing in parallel to an axial direction thereof.

As one example of layout regarding to a roller 2, a notch Fa is provided on a floor plate F for boarding a vehicle thereon and a roller 2 is to be placed under the floor plate F such that the notch Fa and an upper portion of roller 2 are facing each other. In this case, a vehicle is boarded on the floor plate F such that a running direction of a vehicle is perpendicular to an axial direction of roller 2. A measuring object-wheel T is boarded on a roller 2, consequently, a roller 2 is vertically pressed by a wheel T due to a vehicle weight.

Figure 2:
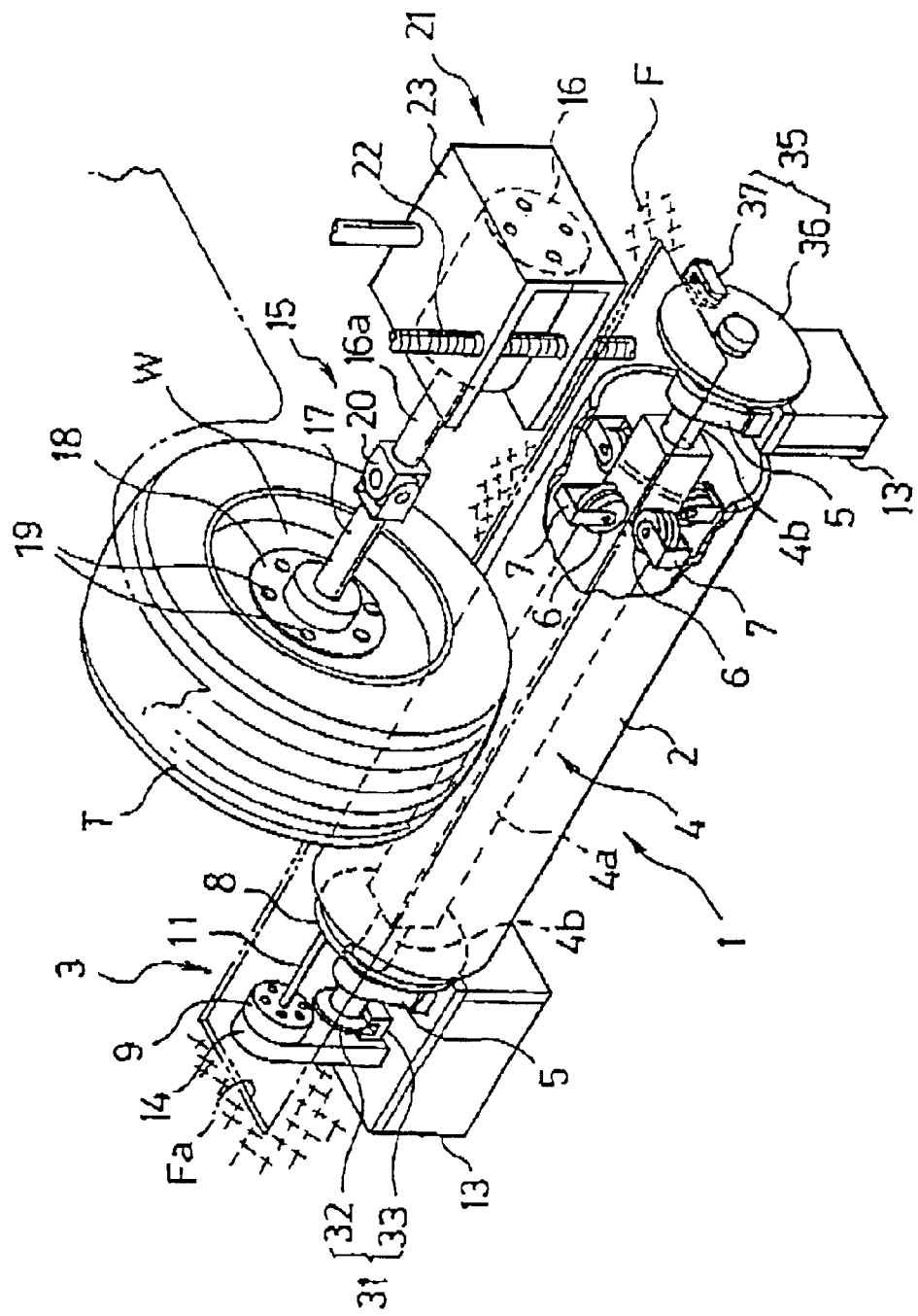
FIG. 2 is perspective view of a lateral force-measuring device.

FIG. 2 is a perspective view of FIG. 1. As shown in FIG. 2, an angular shaft portion 4a is formed on the core of inside roller 2 to provide a core axis 4. An angular shaft portion 4a has a square shaped cross section. A core axis 4 has circular cross sectional shaft portions 4b on both ends thereof Two circular shaped portions 4b are supported by bearings 5 respectively for allowing a roller 2 to be rotated and to be prevented from moving in an axial direction. A bearing 5 is provided on a pedestal 13 installed on a floor under the floor plate F. A square brackets shape-brackets 7 are anchored around the inside of the both end portion of a roller 2 respectively at the interval of 90 degree along the circumferential direction. A single or a plurality (2 bearing rollers for the present invention) of bearing rollers 6 is axially supported such that two axial direction of a bearing roller 6 and a roller 2 cross each other at right angles. And each bearing roller 6 contacts with each face of an angular shaft portion 4a so as to be moved by sliding. According to aforementioned constitution, a roller 2 and a core axis 4 can be rotated together while a bearing roller 6 can be moved by sliding on a surface of a shaft portion 4a for allowing a roller 2 to be moved in an axial direction. In the present invention, a photoelectric rotary encoder is used as a detector 31 for a number of rotation to detect a number of rotation (a vehicle speed) of roller 2, namely, a number of rotation for wheel T. A rotation slit plate 32 is installed on the one end of a core axis 4 while a luminous and euphotic element 33 are installed on a pedestal 13.

Figure 3:
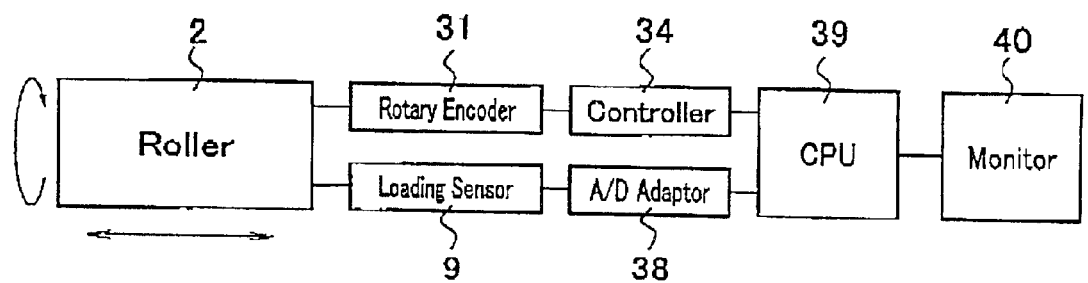
FIG. 3 is a conceptual view and a blocking view of a device for measuring a lateral force.
Figure 4:
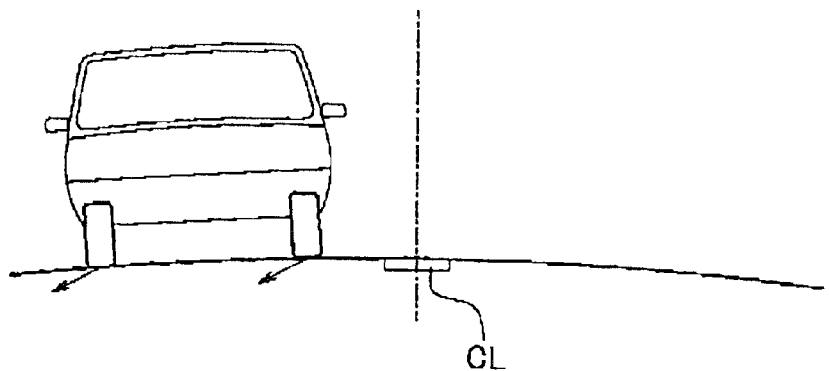
FIG. 4 is an explaining view of a lateral force occurring in a wheel.

FIG. 3 is a block diagram and a concept diagram regarding to a lateral force-measuring method. As shown in FIG. 3, when a roller 2 is rotated, a rotary encoder 31 is dependently rotated. Then a pulse occurs in proportion to the rotation of a rotary encoder 31 for calculating a number of pulses in a controller 34.

Besides, as shown in FIG. 1 and FIG. 2, a brake device 35 is provided on the other end side of core axis 4 to prevent a roller 2 from being rotated without a wheel T boarding thereon when a wheel T is boarded on a roller 2 or when a wheel T is left from a roller 2. A brake device 35 comprises such that a brake disk 36 is provided on the other end of a core axis 4 to be applied brake force by a pad mechanism 37.

And then, according to the present invention, a load-measuring device 3 has a dog 8 and a load sensor 9 as one example. A dog 8 is relatively attached to the roller 2 with universal function for rotating. A load sensor 9 is to measure a moving load of dog 8.

A dog 8 is a member having a cylindrical portion 8a and a flange portion 8b. A cylindrical portion 8a is tightly installed to inside ring portion of a bearing 10 tightly installing in inner face of one end portion of a roller 2 such that a dog 8 can be rotated relatively to a roller 2. Besides, the central hole is a portion wherein said core axis 4 goes through.

As a loading sensor 9 for the present invention, a resistance strain type sensor is used from high sophisticated and economic point of view such that a load applying to a penetrated shaft can be measured while both a tensile load and a compressive load can be measured.

A load-measuring device of the present invention comprises that a tip portion of rod 11 tightly installed in a flange portion 8b of a dog 8 is penetrated into a load-sensor 9 along an axial direction of a roller 2. Besides, a load sensor 9 is clamped for fixing by a plurality of bolts 12 to a supporting portion 14 anchored on a pedestal 13.

Sequentially, a device 15 for driving a wheel will be explained. The present invention is comprised such that a roller 2 is dependently rotated through a rotation of wheel T. when a measuring-object wheel T is a driving wheel, a wheel T itself can be driven for rotating by running an engine of a vehicle. However, when a wheel T is a driven wheel, a device for rotating a wheel T is needed.

A code 16 indicates a throb motor as a power source to be provided toward a wheel T side such that the output axis 16a is the same direction as the axial direction of a roller 2.

On the other hand, as wheel T side, a surface of desk wheel W is coaxially covered with a disk shaped cap member 18 having a shaft 17 fixed into a center portion thereof Then the cap member 18 is fixed to a surface W by clamping a plurality of fixing bolts 19 for wheel T. Sequentially, a shaft 17 and an output shaft 16a of said throb motor 16 are connected with each other through a universal joint 20. This allows wheel T to be rotated without excessive force even in the case that wheel T has a camber angle or a toe angle because these degree are absorbed into a universal joint 20.

According to the present invention, a device 21 for elevating a power source is provided to adjust the height of a throb motor 16 in response to a various length of diameters of wheel.

The device 21 is comprised such that a throb motor 16 placed in a bracket 23 is universally elevated by adjusting a screw mechanism 22.

An operation of the aforementioned lateral force-measuring device will be now explained.

First of all, a driver makes a vehicle turn in the floor plate F to put a measuring-object wheel T onto a roller 2 such that a running direction of a vehicle is perpendicular to an axis of a roller 2. (A wheel T is put onto a roller 2 such that a rotating axis of wheel T is placed on right above an axis of a roller 2.)

At this time, a brake disk 36 is clamped by a pad mechanism 37 for preventing a roller 2 from being rotated before a wheel T is put onto a roller 2. Consequently, a wheel T is put onto a roller 2 in a stable condition. In addition, a vehicle body is fixed by a jig (not shown), for example, so as not be moved.

Once a wheel T is positioned, a pad mechanism 37 is released for rotating a wheel T.

When a wheel T is a driving wheel, an engine of a vehicle can be run for rotating a wheel T itself.

On the other hand, when a wheel T is a driven wheel, a wheel T can be rotated by a wheel driving-device 15. (Of course, even though a wheel T is a driving wheel, a wheel T can be rotated by a device 15 under the condition that a gear is in neutral.)

First of all, the height of a throb motor 16 is adjusted by a device 21 for elevating a power source such that the height of output shaft 16a is the same as that of a rotary axis of a wheel T. A cap member 18 attached into a shaft 17 through a universal joint 20 and an output shaft 16a is contacted with a disk wheel W of a wheel T. And then a cap member 18 is fixed into a disk wheel W by cramping bolts 19 of which are once detached.

When a throb motor 16 is driven for rotating a wheel T under aforementioned condition, a rotating roller 2 and a core axis 4 being pressed by a wheel T due to a vehicle weight are also dependently rotated at one time. However, a dog 8 is not rotated due to existence of bearings 10. When a roller 2 begins to rotate, a bearing roller 6 is rotated by sliding on an angular shaft portion 4a of a core axis 4. Such constitution allows a roller 2 and a dog 8 to be applied by a moving load in an axial direction due to a lateral force caused by a wheel T. Such moving load is measured by a load sensor 9 as a tensile load or a compressive load of a rod 11 anchored in a dog 8.

An example of a displaying method for measuring data will be now described with reference to FIG. 3.

When a roller 2 is rotated, a pulse occurs in proportion to a number of the rotation by a rotary encoder 31. Consequently, the pulse number is calculated by a controller 34.

A pulse number is processed for arithmetic as a number of rotations of a roller 2 by CPU 39 for being displayed in a monitor 40 as a vehicle speed. In the meantime, a moving load of a roller 2 measured by a load sensor 9 is converted into digital from analog by A/D adopter 38 for being displayed as a lateral force of a wheel T in a monitor 40 via CPU 39. A value of vehicle speed and lateral force can be displayed in a monitor 40 as digital readout in a real-time. Or a value of a lateral force in a certain value of vehicle speed can be displayed as invariable value as average by adding a holding switch function in CPU 39. Moreover, a value of vehicle speed and lateral force can be displayed as analog readout (Scale displaying).

What is more, of course, a memory and a printer can be connected with CPU 39 for preserving and recording a measuring data.

As described above, the present invention comprises a roller 2 that is dependently rotated. If it is constituted such that a roller 2 (core axis 4) is a driving side, a moving load occurs insufficiently in a roller 2 because resistance force is increased due to the driving torque. Consequently, a lateral force of a wheel T can not be accurately measured.

On the other hand, if it is constituted such that a roller 2 is dependently rotated, a resistance occurring in a roller 2 is quite scanty. Consequently, a moving load of a roller 2 can be accurately measured as a lateral force of a wheel T. Besides, as a diameter of a roller 2 is expanded, the contact point between a wheel T and a roller 2 can be approximated to the state such that a wheel T is actually contacted with a flat road. However, a roller 2 gain weight in accordance with this. Consequently, a moving load of a roller 2 is measured as the smaller value than that of a real lateral force of a wheel T. Therefore, a diameter of a roller regarding to the present invention is subject to be approximately 300 mm from such point of view. In addition, if a roller 2 is made of a metal having a low related density such as aluminum, a weight is reduced. Consequently, a moving load of a roller 2 can be more approximated to a lateral force of wheel T.

Further, according to the present invention, a certain friction coefficient can be secured between both surface of a roller 2 and a wheel T by using a plate having a dent and projection surface. However, another method can be applied such that a groove or asphalt layer is formed on a surface of roller 2 to secure a given friction coefficient.

The aforementioned description is the explanation of a preferred embodiment of a lateral force-measuring device and a lateral force-measuring method for a wheel regarding to the present invention. The aforementioned embodiment is the case that one wheel is individually loaded onto a rotator (roller) for measuring a lateral force. However, a plurality of a lateral force-measuring devices may be installed for measuring a plurality of wheels simultaneously. In addition, it can be also constituted such that two of front wheels or rear wheels are loaded onto one roller for measuring a lateral force of the wheels. Furthermore, an embodiment of the present invention can not be restricted to the kind or configuration of members constituting each device and an installing position as shown in the figures.

Consequently, the vehicle inspecting system can be provided such that an individual vehicle having various wheel bases or wheels can be inspected by quipping a vehicle inspection device, a wheel base-adjusting mechanism, and a lateral force-measuring device.

Herein, a vehicle inspection device has a simplified controlling mechanism, miniaturized equipment itself, and an elevating style break tester. A wheel base-adjusting mechanism can be adjusted by corresponding vehicle inspection equipment having an elevating style break tester to a measuring-object wheel base.

Besides, a lateral force measuring-device and a lateral force measuring-method of wheel, and a vehicle inspecting system having the device is not restricted to said embodiment. However, it can be properly varied as long as it is based on a technical thought of the present invention.

Furthermore, the present invention also has "a vehicle inspecting device having an elevating style break tester" described in our Japanese patent No. 2961403, which is incorporated herein by reference.

According to the present invention, the following effects can be exhibited.

The present invention comprises a rotator and a load-measuring device. A rotator is axially installed with universal function for moving in an axial direction and is dependently rotated by a rotation of a pressed wheel. A load-measuring device is to measure a moving load for an axial direction of a rotator when a rotator is rotating. Therefore, a moving load of a rotator can be accurately measured as a lateral force of wheel.

The present invention further comprises such that said rotator axially installed with universal function for moving in an axial direction is dependently rotated by a rotation of one of a pair of pressed wheels.

Consequently, a running characteristic of vehicle for a lateral force of wheel can be easily grasped when a vehicle is developed and designed or after a damaged vehicle is repaired. At this time, object vehicle is not only for a general vehicle running in a public road but also for a racing vehicle going around a racing course in the same direction.

The present invention comprises a dog and a load sensor. A dog is relatively attached to said rotator with universal function for rotation. A load sensor is to measure a moving load of dog. Accordingly, a lateral force-measuring device excel in economy can be materialized.

The present invention comprises a wheel-driving device. Accordingly, a wheel can be rotated even in the case that a measuring-object wheel is a driven wheel.

The present invention can provide a vehicle inspecting system capable of materializing a saving of floor space by incorporating a lateral force-measuring device for wheel therein, and of carrying out a consolidated vehicle inspection including a lateral force measurement for wheel.

The present invention comprises such that a wheel is pressed to a rotator axially installed with universal function for moving in an axial direction, and a rotator is dependently rotated by a rotation of a wheel to measure a moving load for an axial direction of a rotator.

The present invention further comprises such that one of a pair of wheels is independently pressed to a rotator axially installed with universal function for moving in an axial direction.

Accordingly, a moving load of a rotator can be accurately measured as a lateral force of wheel.

Consequently, a running characteristic of a vehicle for a lateral force of wheel can be simply grasped when a vehicle is designed or after a damaged vehicle caused by a traffic accident is repaired.

What is claimed is:

1. A lateral force-measuring device for a wheel comprising;
    a rotator in frictional contact with the wheel, said rotator being operable to move in an axial direction when dependently rotated by a rotation of the wheel;
    a load-measuring device attached to a dog, the load-measuring device being operable to measure a moving load in an axial direction of said rotator when said rotator is rotated by the rotation of the wheel, wherein the moving load can be either of both a tensile load and a compression load; and
    a wheel-driving device operable to rotate said wheel, wherein the wheel driving device comprises a throb motor operable to stably control the rotation of said wheel and prevent excessive force from being exerted on the wheel.

2. The lateral force-measuring device as claimed in claim 1, wherein said rotator is dependently rotated by a rotation of one of a pair of axially connected wheels.

3. A lateral force-measuring device as claim forth in claim 1, wherein said rotator is attached to the dog and said load-measuring device is operable to measure a moving load of the dog.

4. The lateral force-measuring device as set forth in claim 2, further comprising:
    a wheel-driving device operable to rotate said wheel, wherein the wheel driving device comprises a throb motor operable to stably control the rotation of said where and prevent excessive force from being exerted on the wheel.

5. The lateral force-measuring device as set forth in claim 3, further comprising:
    a wheel-driving device operable to rotate said wheel, wherein the wheel driving device comprises a throb operable to stably control the rotation of said wheel and prevent excessive force from being exerted on the wheel.

6. A vehicle inspecting system inspecting system incorporating lateral force-measuring device as set forth in any one of claims 1 to 3 and 4 to 5.

7. A lateral force-measuring method comprising: pressing a wheel surface to a rotator; connecting a wheel driving device to the wheel;
    stably rotating the wheel by controllably rotating the wheel driving device; and
    measuring a lateral force exerted by the rotating wheel on the rotator by determining an amount of compression or tension exerted on a dog connected to the rotator;
    wherein the rotator includes an angular shaft portion disposed inside of a roller, and being roller anchored to the inside of the roller, said bearing rollers contacting the angular shaft portion to facilitate axial movement of the roller along a longitudinal axis of the angular shaft portion, so that said rotator is capable of moving in the axial direction.

8. The lateral force-measuring as set forth in claim 7, wherein the wheel surface pressed to the rotator is the surface of one of a pair of wheels axially connected together.

9. The lateral force-measuring device as set forth in claim 1, wherein the rotator includes an angular shaft portion disposed inside of a roller and bearing rollers anchored to the inside of the roller, said bearing roller contacting the angular shaft portion to facilitate axial movement of the roller along a longitudinal axis of the angular shaft portion, so that said rotator is cable of moving in the axial direction.

10. A lateral force-measuring method comprising;
    pressing a wheel surface of both of two axially connected wheels to a single rotator;
    pressing a wheel driving device to at least one the wheels;
    stably rotating the wheels by controllably rotating the wheel driving device, and;
    measuring a lateral force exerted by the rotating wheels on the rotator by determining an amount of compression or tension exerted on a dog connected to the rotator;
    bearing rollers anchored to the inside of the roller, said bearing rollers contacting the angular shaft portion to facilitate axial movement of the along a longitudinal axis of the angular shaft portion, so that said rotator is capable of moving in the axial direction.

* * * * *